(12) United States Patent
Park et al.

(10) Patent No.: US 9,423,834 B2
(45) Date of Patent: Aug. 23, 2016

(54) ELECTRONIC DEVICE WITH ELECTRICAL CONNECTION DEVICE

(71) Applicant: Samsung Electronics Co., Ltd., Suwon-si, Gyeonggi-do (KR)

(72) Inventors: Sung-Wu Park, Daegu (KR); Soon-Sang Park, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 14/301,967

(22) Filed: Jun. 11, 2014

(65) Prior Publication Data

US 2015/0036271 A1  Feb. 5, 2015

(30) Foreign Application Priority Data

Jul. 31, 2013 (KR) .................. 10-2013-0090681

(51) Int. Cl.
*H05K 5/00* (2006.01)
*G06F 1/16* (2006.01)

(52) U.S. Cl.
CPC ........... *G06F 1/1658* (2013.01); *G06F 1/1626* (2013.01); *G06F 1/1698* (2013.01)

(58) Field of Classification Search
CPC ..................... G02F 1/133308; G02F 2202/28; B32B 17/10293; B32B 17/1055; B32B 3/02
See application file for complete search history.

(56) References Cited

U.S. PATENT DOCUMENTS 7,920,225 B2 * 4/2011 Nishikawa ............ G06F 1/1626
                                                                349/11
9,196,948 B2 * 11/2015 Yamamoto ............. H01Q 1/002

FOREIGN PATENT DOCUMENTS

KR    10-2012-0094505 A    8/2012

* cited by examiner

*Primary Examiner* — Robert J Hoffberg
*Assistant Examiner* — Hung Dang
(74) *Attorney, Agent, or Firm* — Jefferson IP Law, LLP (57) ABSTRACT

An electronic device is provided. The electronic device includes a bezel area disposed on an edge of a display area, a first component, a second component which is spaced apart from the first component, and an electrical connection device electrically connecting the first and second components, wherein the electrical connection device is disposed through the bezel area. Therefore, the electrical connection device may be embodied in an existing space without a separate installation space, may be assembled easily, may prevent performance deterioration of other components due to interference and also may contribute to slimming and performance improvement of the electronic device.

15 Claims, 6 Drawing Sheets

ELECTRONIC DEVICE WITH ELECTRICAL CONNECTION DEVICE

CROSS-REFERENCE TO RELATED APPLICATION(S)

This application claims the benefit under 35 U.S.C. §119(a) of a Korean patent application filed on Jul. 31, 2013 in the Korean Intellectual Property Office and assigned Ser. No. 10-2013-0090681, the entire disclosure of which is hereby incorporated by reference.

TECHNICAL FIELD

The present disclosure relates to an electronic device. More particularly, the present disclosure relates to an electrical connection device which electrically connects between components disposed in an electronic device.

BACKGROUND

Currently, due to development of electronic communication industry, electronic devices, such as cellular phones (smart phones), electronic notebooks, personal complex terminals, TVs (Televisions) and lap-top computers, have become a daily necessity of modern society and have significantly changed the means of delivering information. These electronic devices facilitate a user's work via a Graphical User Interface (GUI) environment using a touch screen and providing various web-based multi-media capabilities.

The electronic devices have a tendency to have a gradually reduced size, while being developed to add various additional functions. Therefore, it is necessary to provide additional modules for performing the corresponding additional functions, and rationally and efficiently arrange the modules in the electronic devices as the electronic devices become slimmer.

For example, the electronic devices should have at least one communication antenna module, a speaker module, a microphone module, a vibrator for vibration, a main board, a touch screen panel device, a battery pack and so on. Since these components are electrically connected to a main board, an arrangement of an electrical connection device is very important.

Currently, since a display module including a touch screen function occupies most of a front surface of an electronic device, a size of the main board is gradually reduced, and an installation position of the main board is also limited. Therefore, when installing the modules, it is desirable that the modules are installed to be necessarily adjacent to the main board, but in many cases, the modules may not be so installed. In these cases, the modules may be electrically connected by using a separate electrical connection device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device with an electrical connection device.

Another aspect of the present disclosure is to provide an electronic device with an electrical connection device having excellent assemblability.

Another aspect of the present disclosure is to provide an electronic device with an electrical connection device which uses an existing area without a separate arrangement space for the electrical connection device and contributes to slimming of the electronic device.

Another aspect of the present disclosure is to provide an electronic device with an electrical connection device which prevents performance deterioration of other components.

In accordance with an aspect of the present disclosure, an electronic device is provided. The electronic device includes a bezel area disposed on an edge of a display area, a first component, a second component which is spaced apart from the first component, and an electrical connection device electrically connecting the first and second components, and the electrical connection device is disposed through the bezel area.

In accordance with another aspect of the present invention, an electronic device is provided. The electronic device includes a bezel area disposed on an edge of a display area, a main board, at least one component, installed to be the least one component being spaced apart from the main board, and an electrical connection device configured to electrically connecting the at least one component. The electrical connection device is disposed through the bezel area.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other objects, features, and advantages of certain embodiments of the present disclosure will become more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to various embodiments, an electronic device may include a bezel area defined on an edge of a display area, a first component, a second component installed to be spaced apart from the first component, and an electrical connection device electrically connecting the first and second components. In the electronic device, the electrical connection device may be disposed through the bezel area.

According to various embodiments, the bezel area includes at least one step difference compensation tape, and the electrical connection device may be applied to the step difference compensation tape.

According to various embodiments, the step difference compensation tape has an installing groove longitudinally defined therein to have a predetermined depth, and the electrical connection device is installed in the installing groove. According to an embodiment, the depth of the installing groove may be greater than at least a thickness of the electrical connection device.

According to various embodiments, the electrical connection device may be disposed between the two step difference compensation tapes. According to an embodiment, the thickness of the electrical connection device may be less than that of the two step difference compensation tapes.

According to various embodiments, the step difference compensation tape is attached to a metal bracket of the electronic device, and the electrical connection device may be disposed between the step difference compensation tape and the metal bracket. According to an embodiment, the electrical connection device may include at least one grounding unit so as to be grounded to the metal bracket. According to an embodiment, the at least one grounding unit may be at least one of a metal tape, a conductive poron tape and a conductive spray.

According to various embodiments, the bezel area is installed to be in contact with the metal bracket, and the electrical connection device may be disposed between the metal bracket and the bezel area. According to an embodiment, the electrical connection device may include at least one grounding unit so as to be grounded to the metal bracket of the electronic device.

According to various embodiments, the electrical connection device may be electrically connected to the first component or the second component by bypassing or passing through the metal bracket.

According to various embodiments, the electrical connection device may be at least one of a Flexible Printed Circuit Board (FPCB), a coaxial cable and a wire cable which may be a thin wire cable.

According to various embodiments, the first component may be a main board of the electronic device. According to an embodiment, the second component may be a communication antenna of the electronic device.

According to various embodiments, the electronic device may be one of a tablet PC and a mobile communication terminal.

According to various embodiments, an electronic device may include a bezel area defined on an edge of a display area, a main board, at least one component installed to be spaced apart from the main board and an electrical connection device electrically connecting the at least one component, and the electrical connection device may be disposed through the bezel area.

In explaining the various embodiments of the present disclosure, the present disclosure may be applied to various electronic devices including a display module. The display module may be only a Liquid Crystal Display (LCD) module, or may be all touch screen modules including a touch panel.

In explaining the various embodiments of the present disclosure, a tablet type electronic device including a touch screen unit as a display part is illustrated and described, but the electronic device is not limited thereto. For example, the electronic device may include the display module or the touch screen. That is, the present disclosure may be applied to various electronic devices including a Personal Digital Assistant (PDA), a lap-top computer, a mobile phone, a smart phone, a netbook, a Mobile Internet Device (MID), an ultra mobile PC, a tablet PC, a navigation device, or the like.

In general, a conductive material such as the FPCB and the coaxial cable is used for the electrical connection device. Since the electrical connection device is connected so as to cross a battery pack or the display module, performance of other components may deteriorate by parasitic resonance of the electrical connection device. Further, due to a length deviation and a margin length of the electrical connection device, the electrical connection device is arbitrarily moved in the electronic device or interferes with other components, and thus malfunction of the electronic device may occur. Therefore, it is important to efficiently connect the electrical connection device.

Figure 1:
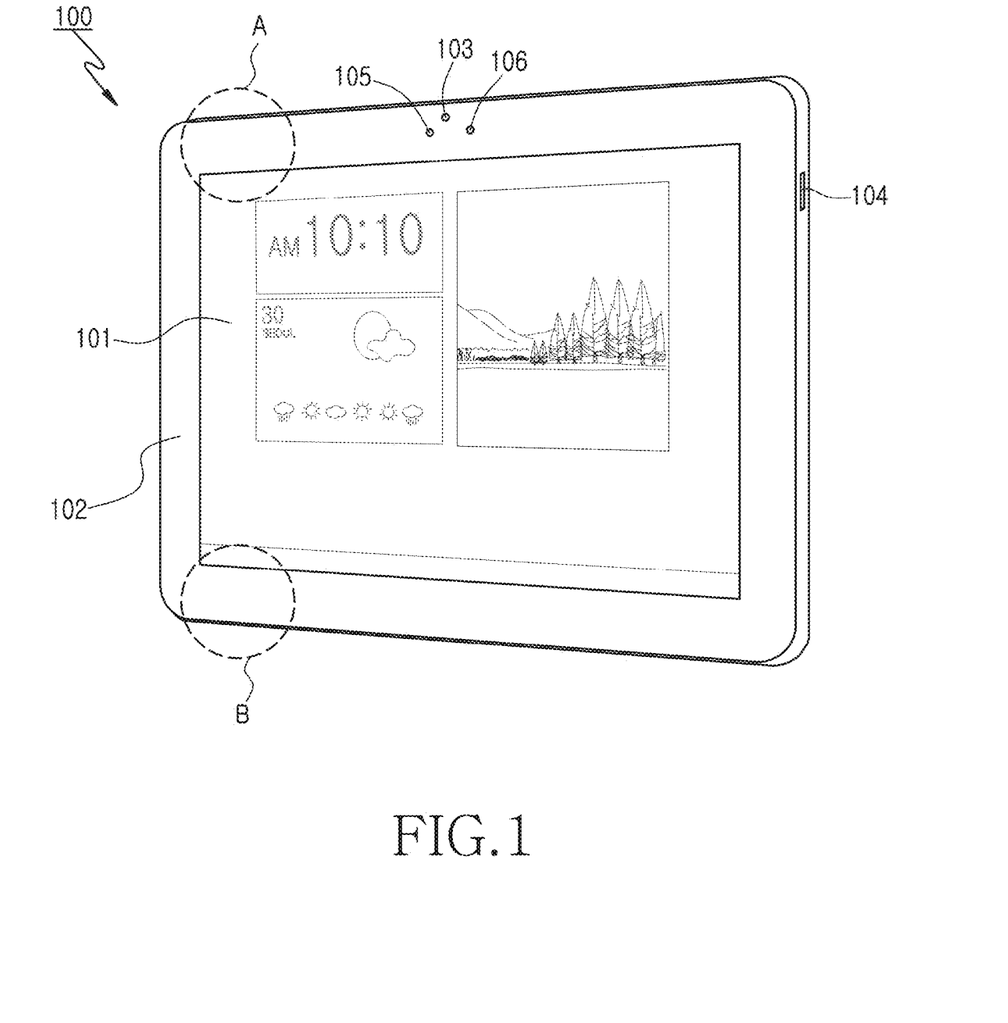
FIG. 1 is a perspective view of an electronic device illustrating installation positions of components according to an embodiment of the present disclosure.

FIG. 1 is a perspective view of an electronic device illustrating installation positions of components according to an embodiment of the present disclosure.

Referring to FIG. 1, an electronic device 100 may include a display area 101 and a bezel area 102 at a front surface thereof. An LDC module as a display module is installed in the display area 101, and a touch panel as an input unit may be disposed thereon. A touch screen unit may be applied to the display module 101 of the display area 101. The display area 101 may be disposed over an entire surface of the electronic device 100, and the bezel area 102 may be disposed on an edge of the electronic device 100 so as to enclose the display area 101. The bezel area 102 may be used as an arrangement area, such as an LCD driver IC (LDI) area, for various electrical wirings of the touch screen unit.

At least one microphone unit 103 may be installed at an upper side of the display area 101, and at least one speaker unit 104 may be installed at a side surface of the electronic device 100. However, the microphone unit 103 and the speaker unit 104 may be disposed at other positions of the electronic device 100, instead of positions thereof illustrated in the drawing.

According to an embodiment, a camera module 105 may be installed at the front surface of the electronic device 100, and at least one sensor module 106, as a sensing unit, for controlling the electronic device 100 may be installed according to surrounding environment. The sensor module 106 may include various sensors such as an illuminance sensor which detects a peripheral illuminance and controls a brightness of the display module and a proximity sensor which detects approaching of a user's face to the electronic device 100 and controls activation of the display module.

According to an embodiment, the electronic device 100 may perform a communication function. For example, the electronic device 100 may perform a near field communication function using a near field communication module, such a Bluetooth module and a Wi-Fi module, as well as a basic call function.

The above-mentioned communication modules may at least one antenna unit, and the antenna unit may be electrically connected with the main board of the electronic device 100. According to an embodiment, the antenna unit may be configured to be separately provided in plural units, and thus may include at least one antenna unit disposed to be adjacent to the main board, and a sub antenna unit disposed to be spaced apart from the main board.

Referring to FIG. 1, the main board may be disposed at an upper portion of the electronic device, and the antenna unit may be disposed at a position A adjacent to the main board, and the sub antenna unit may be disposed at a position B. In this case, the main board and the sub antenna unit are electrically connected with each other, and the electrical connection device may be disposed so as to not cross the display area 101 but instead, pass through the bezel area 102. Therefore, it is possible to prevent conventional spatial limitation which may occur when crossing the display area 101 and performance deterioration of peripheral components due to the electrical connection device made of the conductive material. According to an embodiment, since the electrical connection device is disposed in the bezel area 102, it is not necessary to provide an installation space for a separate electrical connection device.

Hereinafter, the antenna unit according to the present disclosure will be described fully.

Figure 2:
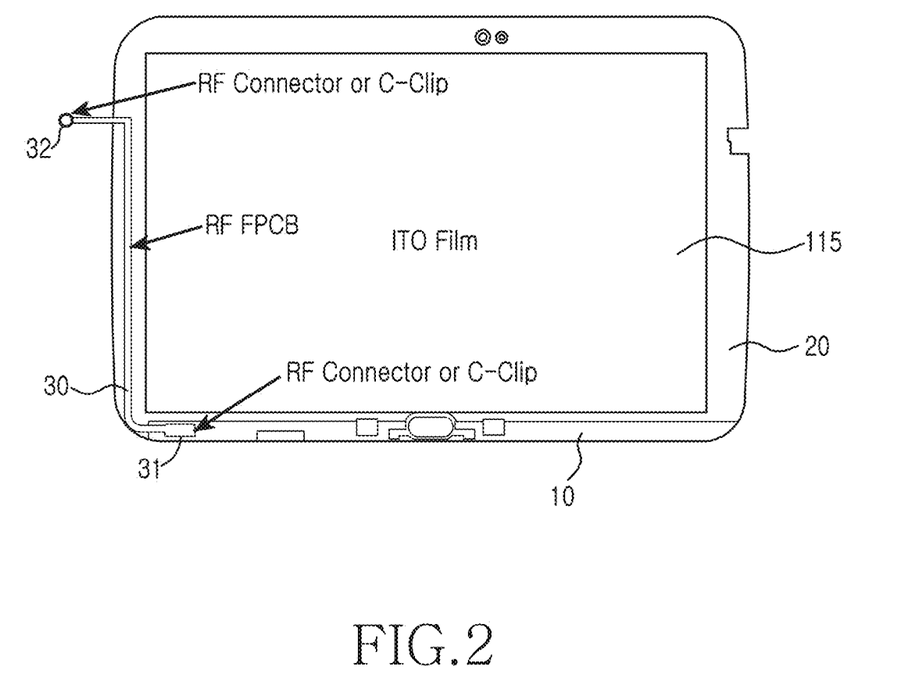
FIG. 2 is a configuration view illustrating a state in which an electrical connection device is applied to a metal bracket according to an embodiment of the present disclosure.
Figure 3:
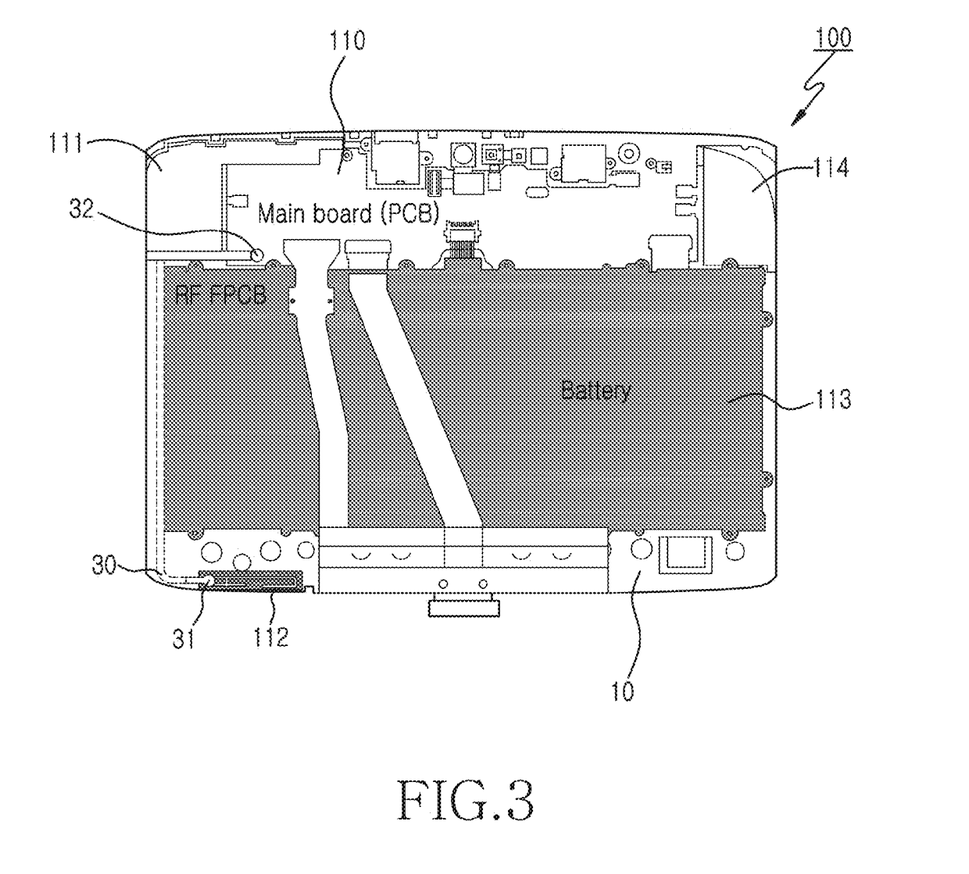
FIG. 3 is a configuration view illustrating a state in which an electrical connection device is installed in an electronic device according to an embodiment of the present disclosure.

FIG. 2 is a configuration view illustrating a state in which an electrical connection device is applied to a metal bracket according to an embodiment of the present disclosure, and FIG. 3 is a configuration view illustrating a state in which an electrical connection device is installed in an electronic device according to an embodiment of the present disclosure.

Referring to FIGS. 2 and 3, according to various embodiments, in the electronic device 100, the bezel area may be disposed along an edge of a touch panel 115. A step difference compensation tape 20 compensating a step difference by a thickness, which may occur when the touch panel 115 is applied to a window (not shown) of the electronic device, may be attached to the bezel area. The step difference compensation tape 20 is a double-sided tape of which one side may be attached to an inner surface of the window of the electronic device 100 and the other side may be attached to an inner surface of a case frame of the electronic device 100.

According to an embodiment, the step difference compensation tape 20 may be attached to a bracket 10 of the electronic device 100, which is made of a metallic material. This is caused by that, recently, the bracket 10 made of a metallic material has much stronger durability and better appearance than the case frame made of a synthetic resin material.

According to an embodiment, a cable made of a conductive material, such as the FPCB, the coaxial cable and the thin wire cable may be used for an electrical connection device applied to the step difference compensation tape 20. An embodiment in which the electrical connection device 30 is applied to the step difference compensation tape 20 will be described later.

According to an embodiment, connector units 31 and 32 may be installed at both ends of the electrical connection device 30. The connector units 31 and 32 may be an RF connector which is electrically connected to a main board 110 and a sub antenna unit 112. According to an embodiment, the connector units 31 and 32 may be a C-clip to which pad type contacting portions provided at both ends of the electrical connection device 30 may be naturally connected when assembling the electronic device 100. According to an embodiment, the connector units 31 and 32 may be soldering for soldering the both ends of the electrical connection device 30, or may be a metal tape. According to an embodiment, the both ends of the electrical connection device 30 may be electrically connected to the main board and the sub antenna unit by a well-known electrical connection device.

As illustrated in FIG. 3, the main board 110 having a predetermined size is disposed at the upper portion of the electronic device 100, and a battery pack 113 may be disposed there below. Antenna units 111 and 114 may be disposed at both sides of the main board 110.

According to an embodiment, the electrical connection device 30 may be installed through the bezel area, and both ends thereof may bypass to side surfaces of the metal bracket 10 and then may be electrically connected to the main board 110 and the sub antenna unit 112.

According to an embodiment, the electrical connection device 30 may be installed through the bezel area, and both ends thereof may be electrically connected to the main board 110 and/or the sub antenna unit 112 disposed on a corresponding surface of the metal bracket 10 using a through-hole (not shown) or a via hole (not shown) defined in the metal bracket 10.

Figure 4:
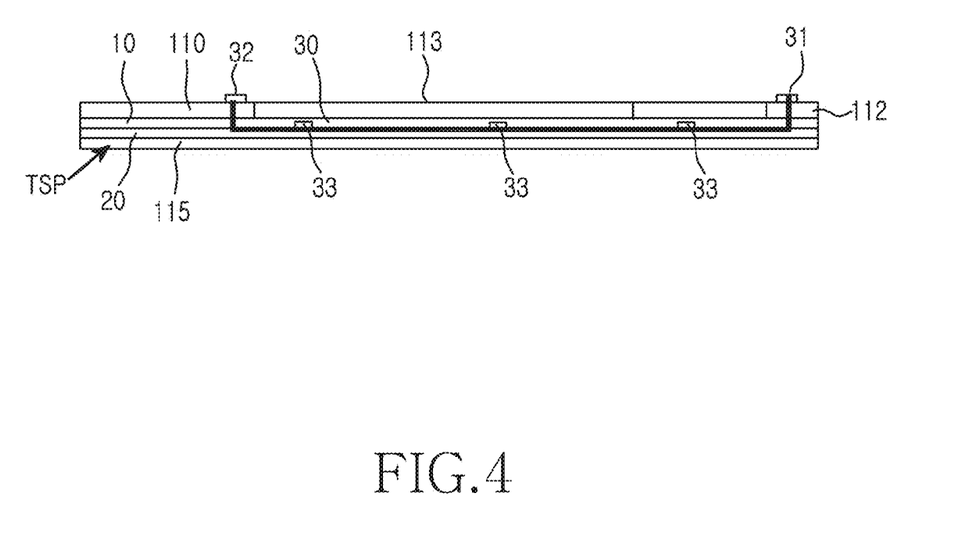
FIG. 4 is a cross-sectional view of an electronic device in which an electronic device is installed according to an embodiment of the present disclosure.

FIG. 4 is a cross-sectional view of an electronic device in which an electronic device is installed according to an embodiment of the present disclosure.

Referring to FIG. 4, the step difference compensation tape 20 may be attached to the bezel area along the edge of the touch panel 115. The electrical connection device 30 according the present disclosure may be disposed at the step difference compensation tape 20. Both ends of the electrical connection 30 may bypass or pass through the metal bracket 10 and then may be electrically connected to the main board 110 and the sub antenna unit 112 through the connector units 31 and 32.

According to an embodiment, since the electrical connection device 30 is made of a conductive material, parasitic resonance may be generated. The parasitic resonance may serve as a factor of deteriorating radiation performance of components of the electronic device 100, particularly, the antenna unit. In the present disclosure, at least one grounding unit 33 may be disposed between the electrical connection device 30 and the metal bracket 10. The connection device 30 is grounded to the metal bracket 10, and the parasitic resonance which may occur by the electrical connection device 30 is prevented, and thus it is possible to prevent performance deterioration of the peripheral components.

According to an embodiment, at least one conductive poron tape as the grounding unit 33 may be disposed in an interval. According to an embodiment, various conductive materials such as a metal tape, a C-clip and a conductive spray may be used for the grounding unit.

Figure 5:
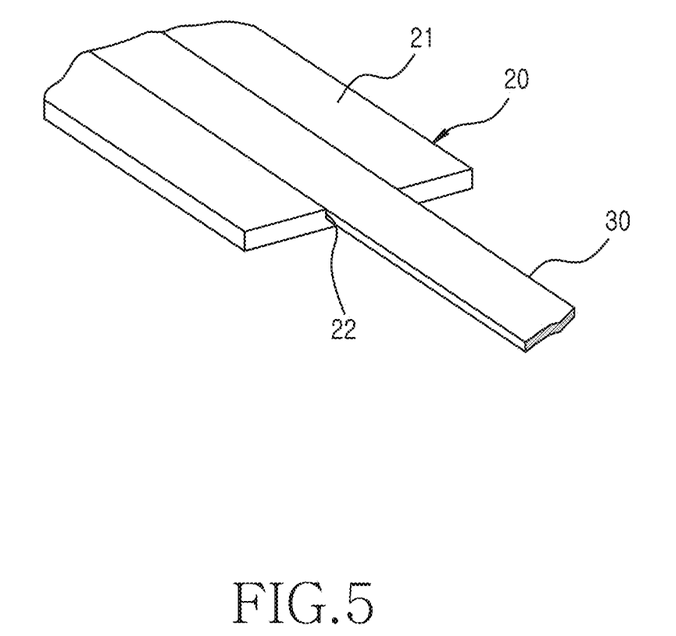
FIG. 5 is a perspective view illustrating a state in which an electrical connection device is applied to a step difference compensation tape according to an embodiment of the present disclosure.
Figure 6:
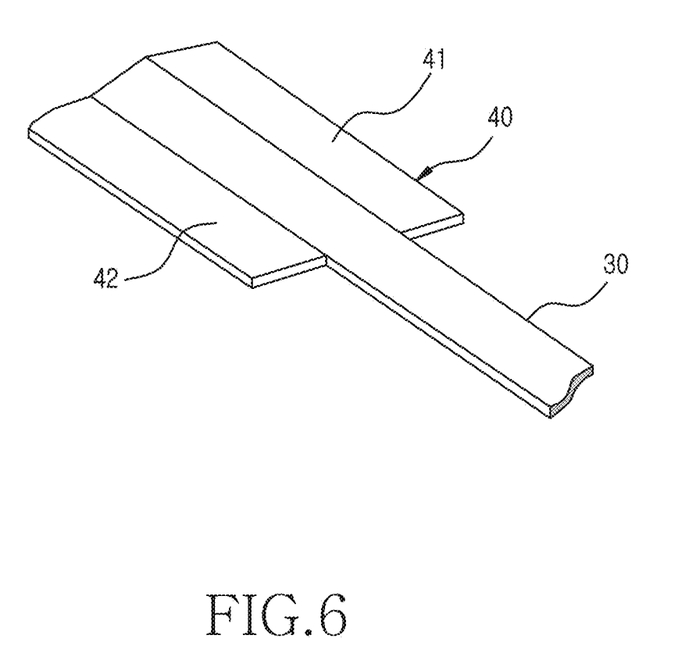
FIG. 6 is a perspective view illustrating a state in which an electrical connection device is applied to a step difference compensation tape according to an embodiment of the present disclosure.

FIGS. 5 and 6 are perspective views illustrating each state in which an electrical connection device is applied to a step difference compensation tape according to an embodiment of the present disclosure.

Referring to FIG. 5, the step difference compensation tape 20 may have an installing groove 22 longitudinally defined in an upper surface 21 thereof so that the electrical connection device 30 may be installed therein. Accordingly, the electrical connection device 30 may be installed and fixed in the installing groove 22 of step difference compensation tape 20. A depth of the installing groove 22 of the step difference compensation tape 20 may be greater than at least a thickness of the electrical connection device 30 so that the electrical connection device 30 does not protrude to an outer surface of the step difference compensation tape 20, when the electrical connection device 30 is installed in the installing groove 22.

Referring to FIG. 6, the step difference compensation tape 40 may be configured to be divided into two tapes 41 and 42, and the electrical connection device 30 may be disposed between the two tapes 41 and 42. In this case, the step difference compensation tapes 41 and 42 may be applied even to a case that the thickness of the electrical connection device 30 is thicker. The thickness of the electrical connection device 30 may be formed to be less than at least a height of the two step difference compensation tapes 41 and 42 so that the electrical connection device 30 does not protrude over outer surfaces of the step difference compensation tapes 41 and 42, when the electrical connection device 30 is disposed between the two step difference compensation tapes 41 and 42.

According to various embodiments, the electrical connection device 30 may be attached to the step difference compensation tape 20 applied to the bezel area of the electronic device, or may be embodied together, but the electrical connection device 30 is not limited thereto. For example, even though the electrical connection device 30 is not applied to the step difference compensation tape 20, the electrical connection device 30 may be disposed in various manners so as to be connected through the bezel area of the electronic device 100.

According to various embodiments, when the step difference compensation tape does not need to be disposed in the bezel area, the electrical connection device 30 may be fixed to the bezel area by a separate bonding unit.

According to various embodiments, when the step difference compensation tape is not used separately, the electrical connection device 30 may be disposed to be installed in a step-shaped portion such as a groove.

According to the above-mentioned various embodiments, the electrical connection device may be embodied in an existing space without a separate installation space, may be assembled easily, may prevent performance deterioration of other components due to interference and also may contribute to slimming and performance improvement of the electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display including a bezel area disposed on an edge of a display area;
a metal bracket disposed in contact with the bezel area of the display;
a first component;
a second component which is spaced apart from the first component; and
an electrical connection member electrically connecting the first and second components,
wherein the electrical connection member is disposed between the bezel area of the display and the metal bracket; and
wherein the electrical connection member further comprises at least one grounding unit configured to ground the electrical connection member to the metal bracket of the electronic device.

2. The electronic device of claim 1, wherein the bezel area comprises at least one step difference compensation tape, and the electrical connection member is applied to the step difference compensation tape.

3. The electronic device of claim 2, wherein the step difference compensation tape has an installing groove longitudinally defined, the installing groove having a depth, and the electrical connection member is installed within the installing groove.

4. The electronic device of claim 3, wherein the depth of the installing groove is greater than at least a thickness of the electrical connection member.

5. The electronic device of claim 2, wherein the electrical connection member is disposed between two step difference compensation tapes.

6. The electronic device of claim 5, wherein a thickness of the electrical connection member is less than a thickness of the two step difference compensation tapes.

7. The electronic device of claim 2, wherein the step difference compensation tape is attached to the metal bracket of the electronic device, and the electrical connection member is disposed between the step difference compensation tape and the metal bracket.

8. The electronic device of claim 1, wherein the grounding unit is at least one of a metal tape, a conductive poron tape and a conductive spray.

9. The electronic device of claim 1, wherein the electrical connection member is electrically connected to one of the first component and the second component by one of bypassing the metal bracket and passing through the metal bracket.

10. The electronic device of claim 1, wherein the electrical connection member is at least one of a flexible printed circuit board (FPCB), a coaxial cable and a thin wire cable.

11. The electronic device of claim 1, wherein the first component is a main board of the electronic device.

12. The electronic device of claim 11, wherein the second component is a communication antenna unit of the electronic device.

13. The electronic device of claim 1, wherein the electronic device is one of a tablet PC and a mobile communication terminal.

14. An electronic device comprising:
a display including bezel area disposed on an edge of a display area;
a metal bracket disposed in contact with the bezel area of the display;
a main board;
at least one component, the least one component being spaced apart from the main board; and
an electrical connection member configured to electrically connect the at least one component,
wherein the electrical connection member is disposed between the bezel area of the display and the metal bracket; and
wherein the electrical connection member further comprises at least one grounding unit configured to ground the electrical connection member to the metal bracket.

15. The electronic device of claim 14, wherein the electrical connection member is electrically connected to one of the main board and the at least one component by one of bypassing the metal bracket and passing through the metal bracket.

* * * * *